Jan. 10, 1933.  W. H. VIDOR  1,893,915
ALTERNATING CURRENT RECTIFIER
Filed Feb. 8, 1929   2 Sheets-Sheet 1
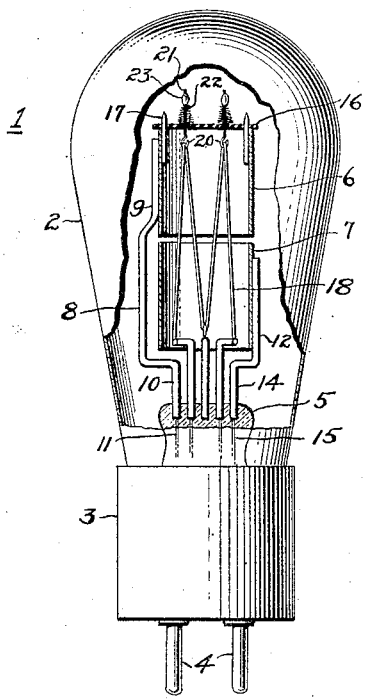
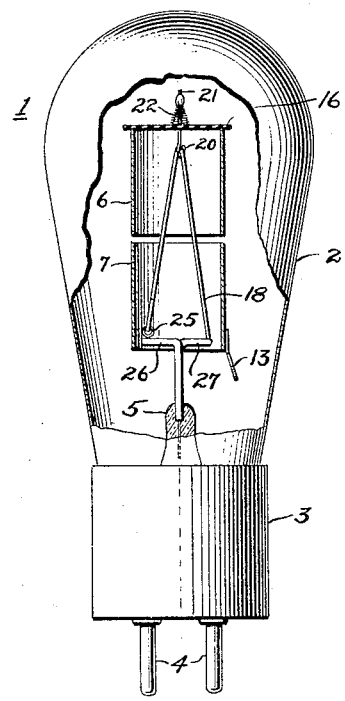
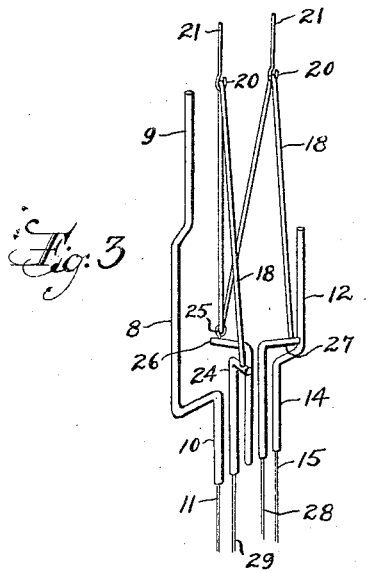
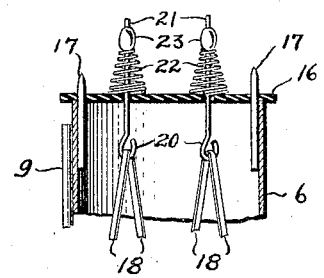
INVENTOR
WILLIAM H. VIDOR
BY
George D. Richards
ATTORNEY Jan. 10, 1933.     W. H. VIDOR     1,893,915
ALTERNATING CURRENT RECTIFIER
Filed Feb. 8, 1929     2 Sheets-Sheet 2
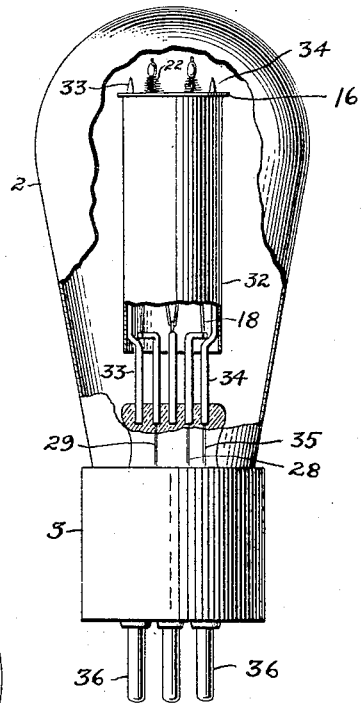
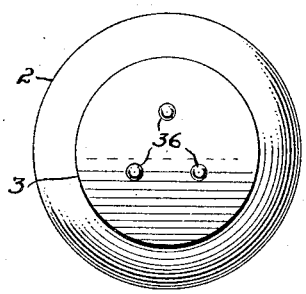
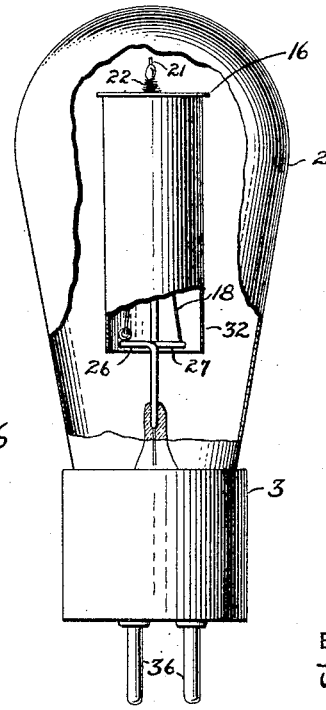
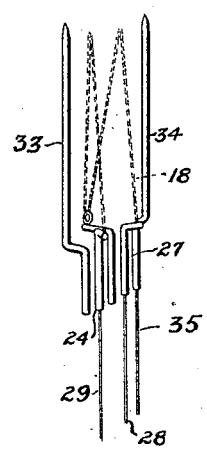
INVENTOR
WILLIAM H. VIDOR
BY
ATTORNEY Patented Jan. 10, 1933

1,893,915

UNITED STATES PATENT OFFICE

WILLIAM H. VIDOR, OF MAPLEWOOD, NEW JERSEY

ALTERNATING CURRENT RECTIFIER

Application filed February 8, 1929. Serial No. 338,371.

This invention relates, generally, to rectifiers for converting alternating electric current into direct current, and the invention has reference, more particularly, to improvements in gas rectifiers of the hot cathode type, and consists in providing a novel construction of rectifier tube having a single cathode or filament and one or more anodes, which rectifier tube is adapted for full wave rectification as well as half-wave rectification.

The rectifier devices at present in common use fall generally within two classes, i. e. they are either of the hot cathode, high vacuum type or of the cold cathode, gaseous type. The hot cathode, high vacuum rectifier has been highly developed and is most generally used in the radio art. This type of rectifier is somewhat an adaptation in the broadest sense of the three-element vacuum tube. Such a tube may be ordinarily used as a rectifier provided the plate and grid are electrically connected and are used together as the anode. The hot cathode, high vacuum type of rectifier has several limitations, however, which not only cause this type of rectifier to have a relatively low current capacity but also a relatively low operating efficiency. The low current capacity of this type of rectifier tube is due to the fact that but a relatively small quantity of the electrons leaving the cathode actually reach the anode to set up a current flow. This is because the space charge of electrons between the hot cathode and the anode exert a repulsive force on the electrons leaving the cathode and tend to drive these electrons back to the cathode, thereby greatly limiting the movement of electrons to the anode. This results in a larger power loss in the tube which loss becomes prohibitively great before the device reaches an operating point of high efficiency. At any given current output of the rectifier, there exists across the rectifier itself a definite voltage which must be maintained, and this voltage represents a loss in power within the tube, which serves no useful purpose in the production of direct current. Rectifiers of this type must adhere closely to certain geometrical designs in order to keep such power losses at a minimum. It is for this reason, that the anode, or plate, of the rectifier, is positioned as close to the cathode or filament as possible.

When rectifiers of this type are designed for full-wave rectification, it is necessary to build two separate tubes which may be sealed into one bulb. Two separate filaments and anodes are employed. If an attempt were made to use a single tube with two anodes and a single filament, or cathode, it will be found that such device is wholly inoperative, due to the fact that the anode, not in use at any particular half cycle of the electrical wave, acts as a grid in its effect upon the other anode and blocks the current flow from the other anode to the filament.

The cold cathode, gaseous type of rectifier has proven in general far less satisfactory than the hot cathode, high vacuum type. There are certain fundamental difficulties with the cold cathode tube, such e. g. as gas absorption, which have never been completely overcome and which render the success of this tube questionable.

It is the principal object of this invention to provide a rectifier of the hot cathode gaseous type which is capable of half-wave or full-wave rectification and which is so constructed and arranged as to employ but a single filament or cathode for either full-wave or half wave rectification and which has a relatively high current capacity, unaffected by space-charge saturation, as well as a high operating efficiency.

The novel rectifier of this invention comprises essentially a single hot filament or cathode and an anode or anodes operating in a gas at low pressure, preferably argon or mercury vapor, or a combination of these, although other gases may also be employed such, for example, helium or neon.

The operation of the tube, so constituted, depends upon the fact that electrons, emitted from the filament or cathode, ionize or split-up the gas molecules, and the ions thus formed carry the electric current. In this manner and for a given area of filament, the current output is many times that carried by the electron emission alone, as in the case of the high vacuum tube.

The limitations imposed by the space charge within the high vacuum tube is not present in the novel rectifier of this invention for the tendency of a cloud of electrons to accumulate within the rectifier of this invention is neutralized by the positive ions of the ionized gas which act to dissipate the space charge as the same tends to form. This elimination or dissipation of the space charge results in two practical advantages, viz., it is not necessary to limit the geometrical design in such a way that the plate and filament are of necessity close together, and, secondly, the efficiency of the rectifying action is greatly increased. Instead of the voltage, and consequently the power loss in the tube, increasing rapidly, with attendant increased current drain or output, the voltage of the novel tube of the present invention is substantially constant over the entire range of current output for which the tube is designed.

The voltage drop across rectifier tubes of the present invention vary somewhat with the geometrical design, but more so with the nature of the gas used. When mercury vapor is used, in whole or in part, the drop seldom exceeds twelve volts, while when argon is employed the voltage does not exceed twenty volts.

Other objects of this invention, not at this time more particularly enumerated, will be clearly understood from the following detailed description of the same.

The invention is clearly illustrated in the accompanying drawings, in which:—

Fig. 1 is a view in elevation with parts broken away of the novel rectifier tube of this invention adapted for full-wave rectification;

Fig. 2 is a view with parts broken away looking at the side of the structure shown in Fig. 1;

Fig. 3 is an enlarged fragmentary perspective view of a portion of the interior of the rectifier showing the filament construction;

Fig. 4 is an enlarged view of a portion of the structure of Fig. 1;

Fig. 5 is a view in elevation with parts broken away of the novel rectifier tube of this invention adapted for half-wave rectification;

Fig. 6 is a view with parts broken away looking at the side of the structure shown in Fig. 5;

Fig. 7 is a view looking up at the bottom of Fig. 5; and

Fig. 8 is a fragmentary perspective view of a portion of the interior of the rectifier of Fig. 5, the filament being illustrated in dotted lines.

Similar characters of reference are employed in all of the hereinabove described views, to indicate corresponding parts.

Referring now to Figs. 1 to 4 of the said drawings, the reference numeral 1 designates a rectifier tube adapted for full wave rectification and embodying the principles of the present invention. Tube 1 comprises a bulb 2 of glass or other suitable material secured to an insulating base 3 having four terminal prongs 4 projecting downwardly therefrom. Bulb 2 is hermetically sealed and contains, preferably, mercury vapor or argon gas or a mixture of these fluids therein at a low pressure. Mercury vapor used alone is preferred, however, and may be injected into bulb 2 in the form of a globule of liquid mercury at the time of evacuating this bulb. The vaporization of mercury from such globule establishes a desired definite vapor pressure of mercury in the bulb 2, which pressure remains substantially constant for the entire life of the rectifier tube, since any absorption of mercury vapor by the glass walls or other interior parts of the tube, merely results in the vaporizing of a corresponding additional quantity of mercury from the globule of mercury present in the bulb 2. Thus, the tube 1 cannot become hard and inoperative through time as from absorption of contained fluid. Although mercury vapor or argon gas are preferably used in tube 1, it is to be understood that other fluids such as helium, or neon may also be used in this tube. All other gases or fluids are removed from tube 1 at the time of evacuation.

Rectifier tube 1 is formed with an integral inwardly projecting teat or pedestal 5 that is adapted to support two anodes and a cathode within the rectifier bulb 2. The two anodes 6 and 7 of the rectifier tube 1 are similar and are illustrated as being of hollow cylindrical shape, and, are arranged in spaced axial alignment, one above the other. These anodes are preferably formed from sheet metal bent into cylindrical shape, with the meeting edges of the sheet metal secured together as by welding.

Anode 6 is supported and positioned centrally within bulb 2 by a bracket 8 made preferably of stiff wire bent to the desired shape. Bracket 8 has an upper offset portion 9 to which anode 6 is secured as by welding, and this bracket has a lower off-set portion 10 that projects into and has its lower end fixedly sealed within the pedestal 5. Bracket 8 also serves as an electrical conductor for the anode 6, and is electrically connected by a lead 11 to one of the external contact prongs 4. Anode 7 is also supported and positioned within bulb 2 below anode 6 by a wire bracket 12, which has a lower off-set portion 14 that projects into and has its lower end fixedly sealed within the pedestal 5. A lead 15 electrically connects the bracket 12 to another of said prongs 4. A lug 13 supports a quantity of magnesium or phosphorus and is illustrated as carried by anode 7. The magnesium or phosphorus on lug 13 is used for absorbing undesired fluids such as traces of oxygen in the bulb 2.

A disk 16 of suitable insulating material, preferably mica, overlies the upper end of anode 6. Positioning pins 17 are secured to the anode 6 near the top thereof and project upwardly through apertures provided in disk 16. These positioning pins 17 serve to hold the disk 16 in concentric overlying relation with respect to the anode 6. Disk 16 is adapted to support a pair of tensioning devices that carry the upper ends of the filament or cathode 18. Each of these tensioning devices comprises a hook 20 having a shank 21 extending upwardly through an aperture in the disk 16. The portion of shank 21 that extends above the disk 16 is surrounded by a conical, helical spring 22 which bears at its lower end against the upper surface of the disk 16 and at its upper end against a projection 23 formed on the shank 21. Projection 23 may be a drop of solder adhering to shank 21 or the projection may be formed by suitably deforming the shank at its upper end.

The filament or cathode 18 is formed from a single continuous strip of suitable metal such as nickel that is coated with either barium or strontium oxides or a mixture of these oxides, which serve to greatly increase the rate of emission of electrons from the filament over that of a pure tungsten filament, or even a thoriated tungsten filament. One terminal of the filament 18 is secured as by welding to a terminal wire 24 having the form of an inverted L, the lower end of which terminal wire is embedded and secured within the pedestal 5. A lead 29 connects the wire 24 to still another of said prongs 4. From the terminal wire 24, one run of the filament 18 extends upwardly and through one of the hooks 20 and from this hook the second run of the filament extends downwardly and through an eye in an eye-member 25 that is carried by a bracket 26 secured to the pedestal 5. From the eye-member 25 the third run of the filament extends upwardly and through the other of the hooks 20 and from this hook the fourth and last run of the filament extends downwardly and has its lower end secured to a terminal wire 27 that is similar to the terminal wire 24. Terminal wire 27 is connected by a lead 28 to the last of said prongs 4.

It is to be noted that the terminal wires 24 and 27 and the bracket 26 are so arranged that each run of the filament is well spaced from the remaining runs thereof, so that there is no possibility of entanglement or interference of one run of the filament with another. Such interference or any similar interference between filament 18 and the anodes is also prevented by the action of the tensioning devices, wherein the upward pull of the springs 22 upon the hooks 20 serves to retain the filament in a taut condition. It will be noted that each run of the filament is so positioned as to be opposite a separate portion of the interior walls of the anodes 6 and 7, which arrangement is conducive of a maximum electron flow from the filament toward the anodes and a maximum current flow from the anodes to the filament.

In operation, the supply of electric current to be rectified is impressed across the prongs 4 that are connected to the anodes 6 and 7. Also a filament current is supplied to the prongs 4 that are connected to the terminals of the filament 18. The filament 18 becoming hot emits electrons, which, traveling at high velocities, collide with molecules of gas present in the bulb 2 and ionize this gas. The negative ions so formed travel to the anode 6 or 7 which is positive with respect to the cathode 18, and the positive ions travel to the cathode and also act to neutralize the electronic space charge and the grid action of the anode that is negative with respect to the cathode. Current thus passes from one of the anodes, e. g. anode 6, to the cathode during one half cycle of the current flow, and from anode 7 to the cathode during the other half cycle of the current flow, thereby giving full wave rectification. Inasmuch as the detrimental effect of space charge and the grid action of the negative anode is eliminated in the novel rectifier of the present invention, this rectifier has a relatively great current capacity. Also, the peculiar construction and manner of supporting the filament 18 gives the tube of this invention an exceedingly long life in actual practice. The presence of barium and strontium oxides on the surface of the filament not only greatly increases the rate of electron emission, but also protects the metal body of the filament from the bombardment of heavy positive ions, which protective action also results in an increased life of the filament and hence of the tube. When mercury vapor is used in the tube, the presence of excess mercury eliminates any hardening of the tube with age.

Figs. 5 to 8 illustrate the novel rectifier tube of this invention adapted for half-wave rectification. In these figures, a single anode 32 is employed, which anode is supported by two brackets 33 and 34 which extend upwardly along the inside surface of the anode and project upwardly through apertures in the disk 16, thereby positioning this disk on top of the anode 32 and eliminating the necessity of positioning pins 17. Bracket 34 is connected by a lead 35 to one of the prongs 36. Since this tube is adapted for half wave rectification only, but three prongs 36 are employed, the remaining two of which complete the filament circuit. Since the other structure of the tube shown in Figs. 5 to 8 is similar to that illustrated in Figs. 1 to 4, like reference characters are used on such structure.

In operation, one side of the supply of alternating current to be rectified is connected to the prong 4 that is electrically connected to the anode 32. For that half of the current wave when anode 32 is positive with respect to the filament 18, current flows through the tube but for the other half cycle when anode 32 is negative with respect to the filament no current flows.

It will be noted that the novel rectifier tube of this invention is of extremely simple yet sturdy construction and possesses novel characteristics of design and operation which are conducive to long life and efficient operation.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A rectifier for converting alternating current into direct current comprising, a hermetically sealed bulb containing a fluid at low pressure, an insulating base secured to said bulb, terminal contact prongs projecting from said base, a metallic cathode filament contained within said bulb and having terminals connected to a pair of said contact prongs, said cathode filament having a suitable metallic oxide coating adapted to increase the electronic emission from said filament, a hollow metallic anode positioned within said bulb in surrounding relation to said filament, a metallic supporting and conducting member connecting said anode to another of said contact prongs, an insulating member overlying the outer end of said hollow metallic anode, and spring tensioned hooks carried by said insulating member supporting said cathode filament therefrom, said cathode filament passing over said hooks and being tensioned thereby so that said cathode filament is held taut at all times.

2. A rectifier for converting alternating current into direct current comprising, a hermetically sealed bulb containing a fluid at a low pressure, an insulating base secured to said bulb, terminal contact prongs projecting from said base, a metallic cathode filament contained within said bulb and having terminals connected to a pair of said contact prongs, said cathode filament having a suitable metallic oxide coating adapted to increase the electronic emission from said filament, a pair of hollow metallic anodes positioned within said bulb in surrounding relation to said filament, said metallic anodes being spaced from one another and independently connected to another pair of said contact prongs, an insulating disk overlying the end of the outermost of said hollow anodes, said insulating disk having apertures therein, hook members slidably positioned within said apertures and compression springs contained between said insulating disk and said hook members urging said hook members outwardly of said anode, said metallic cathode filament being engaged over said hook members and tensioned thereby.

In testimony, that I claim the invention set forth above I have hereunto set my hand this 16th day of January, 1929.

WILLIAM H. VIDOR.